July 13, 1954  F. RIVERON C.  2,683,551

CLOSURE FOR FUEL TANK FILLER SPOUTS

Filed April 27, 1951

INVENTOR.
FAUSTINO RIVERON C.
BY
McMorrow, Berman & Davidson
ATTORNEYS

Patented July 13, 1954

2,683,551

UNITED STATES PATENT OFFICE 2,683,551

CLOSURE FOR FUEL TANK FILLER SPOUTS

Faustino Riveron C., Calexico, Calif.

Application April 27, 1951, Serial No. 223,366

1 Claim. (Cl. 220—24)

This invention relates to closures for fuel tank filler spouts and more particularly to a closure for providing an airtight seal at the end of the filler spout of a vehicle fuel tank and a compressed air inlet valve to subject the fuel in the tank to air pressure.

It is among the objects of the invention to provide a closure for the end of the filler spout of a vehicle fuel tank which closure provides an air-tight seal with the filler spout so that air cannot leak out of the fuel tank past the closure; which provides an air inlet valve so that air under pressure can be forced into the tank and will be retained therein to apply pressure to fuel in the tank and force the fuel to the vehicle engine carburetor in the event of failure of the vehicle fuel pump; which can be quickly and easily applied to the filler spout and may be used as the normal closure for such a spout, if desired; which can be applied to filler spouts of different sizes; and which is simple and durable in construction, economical to manufacture and positive and effective in operation.

Other objects and advantages will become apparent from a consideration of the following description and the appended claims in conjunction with the accompanying drawing, wherein:

Figure 1:
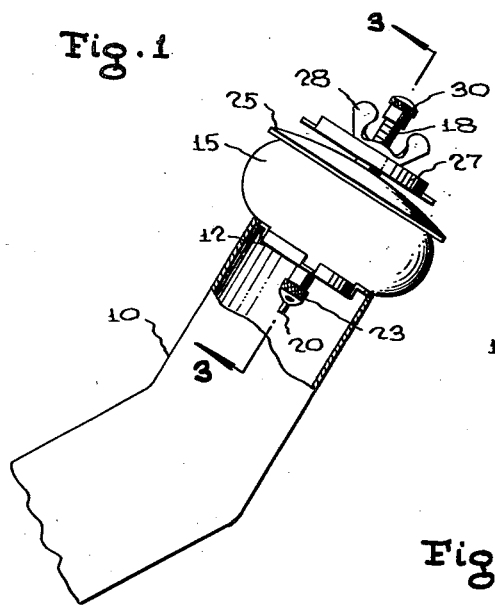
Figure 1 is a side elevational view of a closure cap illustrative of the invention shown applied to a filler spout fragmentarily illustrated and partly broken away and shown in cross section.
Figure 2:
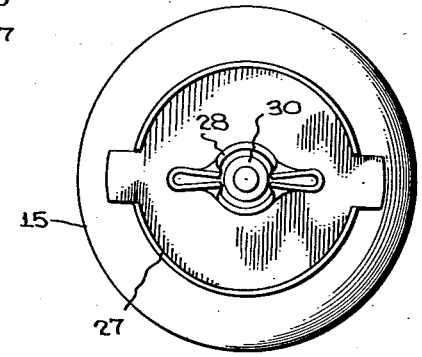
Figure 2 is a top plan view of the filler spout closure cap.
Figure 4:
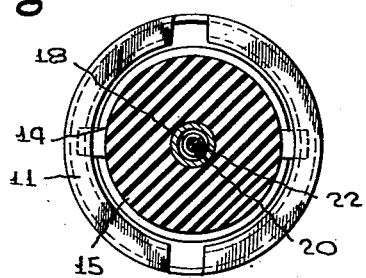
Figure 4 is a cross sectional view on a reduced scale on the line 4—4 of Figure 3.

With continued reference to the drawing, the filler spout as indicated at 10 is a tubular structure having at its distal end an internal annular formation 11 of channel shape cross section provided with diametrically opposed notches and with inwardly directed cam surfaces adjacent the notches so that lugs on a closure cap can be passed through the notches and will ride on the cam surfaces to tightly secure the cap on the spout when the cap is rotated relative to the spout.

The closure cap of the present invention comprises a flat disc 12 having a circular bead or flange 13 on one side thereof disposed substantially perpendicular to the disc and having diametrically opposed lugs 14 projecting outwardly of the flange to pass through the notches in the flange or bead formation 11 at the distal end of the filler spout and ride on the cam surfaces of the formation 11 to hold the disc 12 in the end of the filler spout. A rounded and preferably substantially spherical body 15 of elastic material, such as soft vulcanized rubber, is disposed against the flanged side of the disc 12 and has a diameter materially greater than the diameter of the filler spout 10. This body has a bore 16 extending diametrically therethrough and registering with a centrally disposed aperture 17 in the disc 12.

An externally screw threaded tube 18 extends through the bore 16 of the body 15 and this tube extends through the aperture in the disc 12. This tube has intermediate its length an internal valve seat formation 19 and a valve plunger 20 is disposed in the tube at the side of the valve seat 19 adjacent the disc 12 and has on one end an enlarged portion or head 21, one end of which is conically tapered to cooperate with the valve seat 19 to close the bore of the tube 18 and the other end of which provides an annular shoulder which constitutes an abutment for a coil compression spring 22 which surrounds the valve plunger 20. A hollow cap 23 is threaded onto the end of the tube 18 extending through the disc 12 and provides an abutment for maintaining the disc 12 on the tube. This cap has an aperture for slidably receiving the adjacent end portion of the plunger 20 and the spring 22 acts between this cap and the enlarged portion 21 on the other end of the valve plunger to resiliently urge the plunger into seating engagement with the valve seat 19. The cap is provided with additional apertures or orifices 24 for the passage of compressed air from the tube 18 into the filler spout 10.

A circular dished plate 25 is disposed at the side of the body 15 remote from the disc 12 and has at its center a hollow boss formation 26 through which the tube 18 extends. A disc 27 similar to the disc 12 but of a different diameter is disposed at the side of the dished plate 25 remote from the body 15 and has a central aperture receiving the tube 18. The concaved side of the plate 25 is disposed adjacent the body 15 and the disc 27 is disposed adjacent the outer convex side of this plate.

Figure 3:
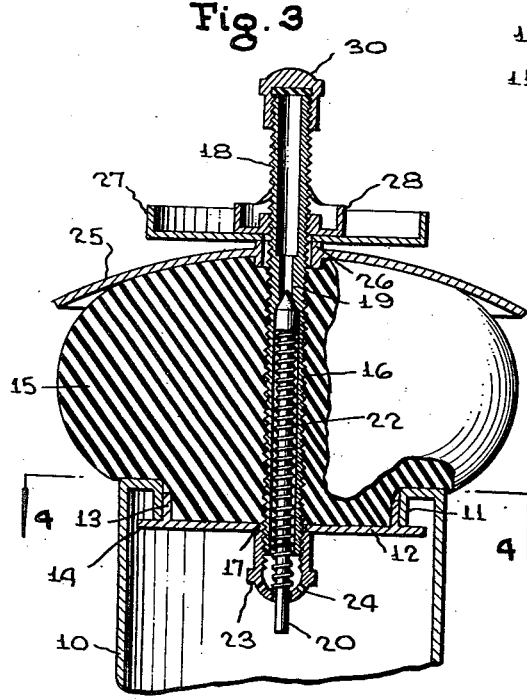
Figure 3 is a cross sectional view on an enlarged scale on the line 3—3 of Figure 1.
Figure 5:
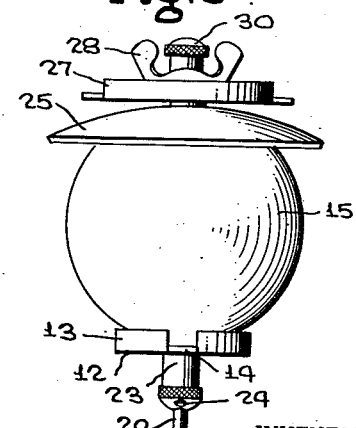
Figure 5 is a side elevational view of the closure cap when in an uncompressed condition.

A wing nut 28 is threaded onto the stem 18 at the side of the disc 27 remote from the plate 25 and can be threaded down on the tube to compress the body 12 between the disc 12 and the plate 25, as illustrated in Figures 1 and 3.

In applying the closure cap to a filler spout, the wing nut 28 is threaded outwardly of the tube 18 until the body 15 of elastic material is relieved of compression and is loosely disposed between the disc 12 and the dished plate 25. The disc 12 is then inserted through the mouth of the filler spout, the lugs 14 passing through the notches in the mouth formation of the spout and the entire structure is then rotated to move the lugs away from the notches. The wing nut 28 is then screwed down on the tube 18 until the body 15 is compressed and its portion adjacent the mouth of the filler spout caused to overlie and press firmly against the end of the spout thereby providing an air-tight seal at the mouth end of the filler spout.

A suitable pump, such as a hand tire pump can then be attached to the outer end of the tube 18 and air pumped into the fuel tank through the tube 18 and past the valve plunger 20 until sufficient air pressure is applied to the fuel in the tank to force the fuel from the tank to the vehicle engine carburetor so that the vehicle engine can continue to operate even though there has been a failure of the vehicle fuel pump or other means provided for supplying fuel to the engine.

After sufficient air pressure has been pumped into the tank the pump is detached from the tube 18 and a cap 30, such as an ordinary tire valve stem cap, is threaded onto the outer end of the tube to keep dust and moisture out of the tube and prevent leakage of air in case the valve in the tube 18 should tend to leak.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A closure cap for a fuel tank filler spout comprising an apertured disc including a plurality of peripheral lugs lockingly engageable with the mouth end of a filler spout and having one side faced outwardly toward said mouth end and its other side faced inwardly toward the other end of the spout, a rounded body of elastic material disposed upon the first named side of said disc to project outwardly of the spout beyond the mouth end thereof and having a diameter greater than the diameter of said disc for seating of the body against said mouth end, an apertured dished plate having its concave side disposed against the side of said body remote from said disc, said body having a bore extending therethrough from said plate to said disc, a tube extending through said plate, said body and said disc and having screw threaded portions adjacent said plate and disc, an apertured cap threaded onto said tube at one end thereof and bearing against said disc and a nut threaded onto said tube at the other end thereof and bearing against said plate for compressing said body between said plate and said disc to force the body into sealing engagement with said mouth end of the spout, and a check valve in said tube operative to permit flow of air through said tube in a direction from said plate to said disc while precluding flow of air through said tube in the opposite direction.

References Cited in the file of this patent

UNITED STATES PATENTS

| Number | Name | Date |
|---|---|---|
| 404,122 | Tatum | May 28, 1889 |
| 409,713 | Sunday | Aug. 27, 1889 |
| 1,369,882 | Brown | Mar. 1, 1921 |
| 1,993,307 | Nicholson | Mar. 15, 1935 |

FOREIGN PATENTS

| Number | Country | Date |
|---|---|---|
| 10,105 | Australia | Nov. 11, 1932 |
| 168,394 | Switzerland | July 2, 1934 |